United States Patent

[11] 3,614,487

| [72] | Inventor | Rudolf A. Hatschek |
| | | Fribourg, Switzerland |
| [21] | Appl. No. | 765,164 |
| [22] | Filed | Oct. 4, 1968 |
| [45] | Patented | Oct. 19, 1971 |
| [73] | Assignee | Vibro-Meter AG |
| | | Fribourg, Moncor, Switzerland |
| [32] | Priority | Oct. 10, 1967 |
| [33] | | Austria |
| [31] | | A 9167/67 |

[54] PIEZOELECTRIC ACCELEROMETER WITH BASEPLATE COOLING
6 Claims, 6 Drawing Figs.

| [52] | U.S. Cl. | 310/8.4, 310/8.7, 310/9, 310/9.1 |
| [51] | Int. Cl. | H01v 7/00 |
| [50] | Field of Search | 310/8.3, 8.4, 8.7, 9.1, 8.2, 8.9; 340/10; 73/74 |

[56] References Cited
UNITED STATES PATENTS

| 3,536,939 | 10/1970 | Zeiringer | 310/8.4 |
| 3,075,098 | 1/1963 | Shoor | 310/8.4 |
| 3,482,121 | 12/1969 | Hatschek | 310/8.4 |
| 2,716,708 | 8/1955 | Bradfield | 340/10 |
| 2,829,361 | 4/1958 | Crandell | 340/10 |
| 2,844,809 | 7/1958 | Batchelder | 340/10 |
| 3,329,408 | 7/1967 | Branson | 310/8.7 |
| 3,370,186 | 2/1968 | Antonevich | 310/8.3 |
| 3,424,930 | 1/1969 | List | 310/8.8 |
| 3,461,327 | 8/1969 | Zeiringer | 310/8.7 |
| 3,460,061 | 8/1969 | Massa | 340/8 |

*Primary Examiner*—Milton O. Hirshfield
*Assistant Examiner*—B. A. Reynolds
*Attorney*—Watson, Cole, Grindle & Watson ABSTRACT: A transducer, in particular a piezoelectric transducer for accelerometry, wherein the measuring elements are located in a housing comprising a bottom by means of which it is mounted on the object to be measured, at least one outwardly open recess being provided in the bottom.

PATENTED OCT 19 1971 3,614,487
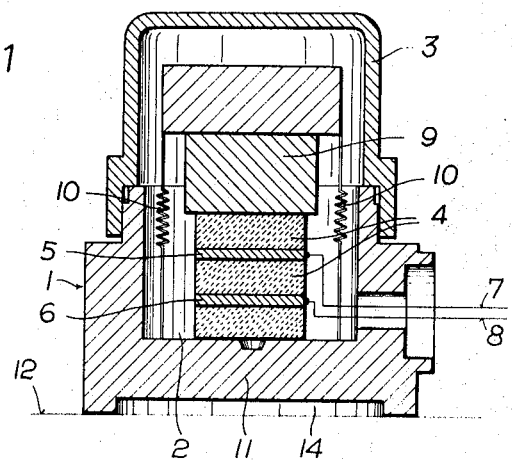
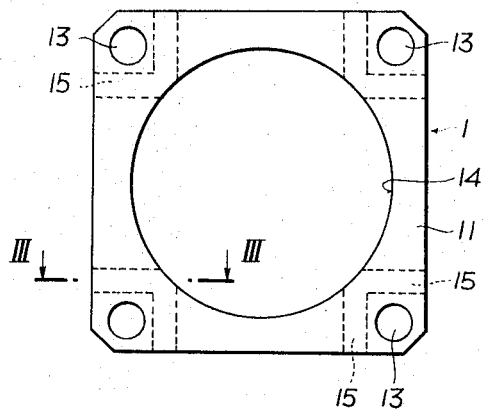
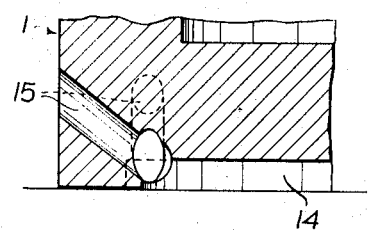
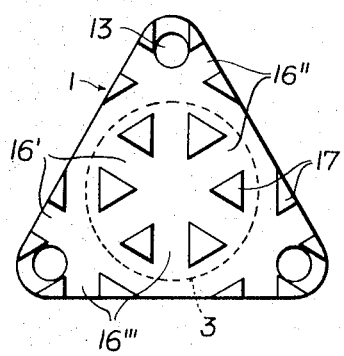
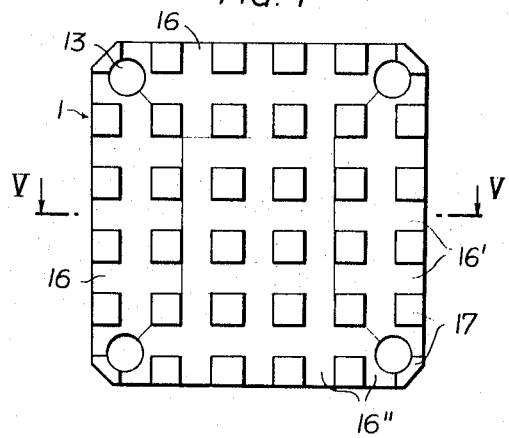
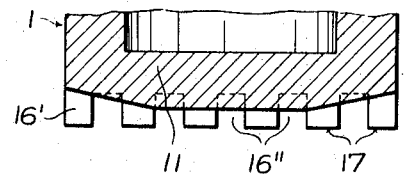
Inventor
Rudolf A. Hatschek
By
Watson, Cole, Grindle & Watson
Attys.

3,614,487

PIEZOELECTRIC ACCELEROMETER WITH BASEPLATE COOLING

BACKGROUND OF THE INVENTION

Both inductive, capacitive, an piezoelectric transducers as well as so-called resistance-type transducers are used for a great variety of technical applications for measuring and monitoring purposes, such as for example, for measurements of pressure and pressure distribution in the cylinders of internal combustion engines and compressors, for the monitoring of motors and power plants and the like. In other the continuous monitoring with aircraft power plants by means of generally piezoelectric accelerometers has gained importance. These accelerometers are usually mounted in appropriate locations of the power plant for the purposes of monitoring operational vibrations of the power plants, and are subject to comparatively high temperatures frequently exceeding 400° C. and liable to impair the measurements, and in particular, their accuracy. For example, piezoelectric quartz transducers are practically serviceable up to a temperature of approximately 400° C. only because at higher temperatures of the quartzes the signals begin to fade. For these and other problems in connection with measurements at higher temperatures also by means of other types of transducers, no satisfactory solution has as yet been offered. Likewise, the mounting of the transducers on the outside of the power plant where they are exposed to he relative wind, or on an intermediate shell in the secondary airstream failed to provide adequate remedy.

SUMMARY OF THE INVENTION

The invention eliminates these difficulties in a simple manner by the provision of a transducer, and in particular of a piezoelectric transducer for accelerometry, comprising a housing and measuring elements located in the housing, the housing having a bottom by means of which it is mounted on the object to be measured, at least one outwardly open recess being provided in the bottom of the housing.

This design of the transducer housing greatly reduces the contact area between the object to be measured and be transducer seated thereon which is of primary importance for the heat transducer. Moreover, the airgap produced by the recess in the bottom of the housing provides a certain amount of heat insulation in that area. Besides, if the recesses are located inside the bottom area of the housing, the heat is mainly transferred in the vicinity of the outer shell of the housing which portion with the generally adopted arrangement of the transducer in the airstream is positively cooled. Consequently, a drop in temperature occurs at the transition point between the object to be measured and the transducer, so that excessive heating of the measuring elements is avoided.

In order to increase the drop in temperature caused by the recesses provided in the bottom of the housing, ducts may be provided in addition to one or more clearances recessed in the bottom, the said ducts leading from the recesses to the outer shell of the housing. Preferably these ducts are designed as bores for example, extending from the outer shell of the housing obliquely downwards as far as the recesses. These ducts which may be outwardly enlarged so as to allow air to pass at high speed through them and through the recesses, produce an airstream through the clearances in the bottom of the housing, thereby achieving an additional cooling effect.

The recesses provided in the bottom of the housing are preferably designed as grooves produced by milling or the like processes and extending as far as the outer shell of the housing. In this connection it is possible to provide at last two bands of parallel grooves in crossed arrangement subdividing the bottom of the housing into a number of uniformly distributed surface elements. The grooves are not only easy to produce but they also preclude any objectionable mechanical weakening of the bottom portion of the housing. In fact, particularly for accelerometry the bottom portion of the transducer which has to transmit the accelerative forces should be as rugged as possible if falsification of the measured values by vibrations and sagging of the bottom portion or by thermal deformation of the same due to heating is to be avoided. The small surface elements obtained by the crossed arrangement of the grooves ensure the mechanically rugged support of the transducer even with a small heat transfer area.

If the transducer is located in the airstream, the cooling system can be further improved by the provision of deeper grooves on the periphery of the bottom than in the central portion thereof, their depth diminishing progressively at least in the vicinity of the periphery of the bottom in the direction towards the center. These grooves extending preferably in the direction of the airflow towards the transducer define tapered ducts producing a kind of nozzle-effect ensuring a relatively powerful airstream and consequently, adequate cooling. Where a plurality of bands of parallel grooves are arranged crosswise, these are preferably aligned in such a manner that whatever the arrangement of the transducer mounted on the surface of the object to be measured, one band of groove extends at least approximately in the direction of flow of the air surrounding the transducer.

BRIEF DESCRIPTION OF THE DRAWING

Further optional details of the invention will appear from the following description of several embodiments of the invention wit reference to he accompanying drawing in which:

FIG. 1 is a schematic longitudinal sectional view of an accelerometer according to the invention, FIG. 2 shows a top view of the bottom, FIG. 3 is a cross-sectional view on line III—III of FIG. 2 on an enlarged scale, FIG. 4 shows the bottom view of another embodiment of the invention, FIG. 5 is a cross-sectional view on line V—V of FIG. 4 and FIG. 6 finally illustrates yet another variant of the design of the bottom of a transducer according to h invention.

DESCRIPTION OF THE PREFERRED EMBODIMENTS

The accelerometer shown in FIG. 1 comprises a housing 1 with a cavity 2 covered by means of a hood 3. The measuring elements consisting of piezocrystals 4 and electrodes 5 and 6 inserted between the said piezocrystals, with electric lead wires 7 and 8 extending outwardly from the said electrodes, are accommodated in the cavity 2. Via an intermediate piece 9 the measuring elements are held by a prestressing device 10 (illustrated schematically in the drawing) which exerts the required prestressing force on the piezocrystals.

The housing 1 of the accelerometer is secured with its bottom portion 11 to a flat mounting surface 12 upon which it is maintained by means of bolts extending through the ores 13 shown in FIG. 2. In order to keep the heat transfer from the mounting surface 12 to the bottom portion 11 of the housing 1 as low as possible, a circular recess 14 is provided in the bottom 11. This recess defines an insulating airgap, leaving only the marginal zone around the recess 14 as illustrated in FIG. 2, available for a metal-to-metal heat transfer. As a result, a drop in temperature occurs at the point of transition between the mounting surface 12 and the bottom portion 11 of the housing 1, preventing excessive heating of the measuring elements, possibly in conjunction with an airstream cooling the outer shell of the housing 1.

As appears from FIGS. 2 and 3, bores 15 are provided in the bottom portion 11 in addition to the recess 14, extending from the outer shell of the housing 1 obliquely downwards and terminating in the recess 14. The bores 15 are inclined in relation to the mounting surface 12 by an angle of approximately 50°. If the transducer is located in the airstream, air enters the bores 15 and passes from them through the recess 14, as a result of which the bottom portion 11 of the housing 1 is further cooled. The bores 15 may also be inclined in relation to the mounting surface by any other angle; they may extend parallel to the said mounting surface and be open in the direction of the mounting surface 12. They may furthermore be provided in any number and in any desired direction. The arrangement shown in FIG. 2 comprising two bores 15 extending in perpendicular relation to each other provided in every corner of the bottom 11 offers the advantage that however the housing 1 may be mounted on the mounting surface 12, one bore 15 extends in every case in each of the corners in the direction of the airstream flowing alongside the housing 1.

FIGS. 4 an 5 show an embodiment of the invention wherein the recesses in the bottom portion 11 are designed as grooves 16. These grooves are recessed in the bottom by milling ad extend as far as the outer shell of the housing 1. As appears from FIG. 4, two bands of parallel grooves are provided, which intersect at right angles, the band 16' being shown in the drawing in a horizontal and the other band 16'' in a vertical position. Between the grooves 16 uniformly distributed square or rectangular surface elements 17 remain, by means of which the bottom 11 rests upon the mounting surface 12. The surface elements 17 ensure a mechanically rigid transfer of force between the mounting surface 12 and the bottom 11 of the housing 1, and prevent vibrations and sagging of the bottom and thermal deformation as a result of a rise in the bottom temperature. At the same time, the grooves 16 serve to reduce the overall heat transfer area to about 25 or 30 percent of the entire bottom surface of the housing 1. Moreover, the grooves 16 permit the passage of air and thus provide adequate cooling for the bottom portion 11. In order to facilitate the passage of air, the grooves 16 near the periphery of the housing 1 are deeper than in the inner area of the bottom 11, their depth increasing progressively from the center towards the periphery.

Finally, FIG. 6 shows an embodiment of the invention comprising a housing 1 with a triangular bottom portion 11. However, in this case too, the hood 3 covering the measuring element is of a cylindrical shape as indicated in the drawing by dotted lines. The triangular housing 1 is secured to the associated mounting surface by means of three bolts extending through bores 13. The bottom portion 11 is provided with groove 16 arranged in three bands 16', 16'' and 16'''. The groove bands intersect at an angle of 60°, thereby subdividing the bottom area into small triangular surface elements 17. This design produces practically the same effect as the design sown in FIGS. 3 and 5. The provision of three groove bands 16', 16'', and 16''' merely offers the advantage of permitting the housing to be mounted on the mounting surface in any spatial position, one of the three grooves bands extending approximately in the direction of flow of the air streaming alongside the housing 1 so as to ensure an adequate passage of air through the grooves 16.

I claim:

1. A transducer, particularly a piezoelectric accelerometer, comprising a housing having a bottom portion of rigid material forming a mounting base adapted to be mounted with its outer surface directly on to a surface of an object to be measured only along a level surface, and measuring elements located in the housing in mechanical contact with the bottom portion thereof, the said bottom portion serving for the transmission of mechanical forces from the object to be measured to the measuring elements, said bottom portion having at least one recess in the outer level surface thereof outwardly open towards the said surface to be measured thereby producing an airgap and reducing the contact area between the surface of the object to be measured and the outer surface of the said bottom portion of the housing.

2. A transducer as claimed in claim 1, wherein ducts are provided extending from the recess as far as a marginal shell of the bottom portion of the housing and being in communication with the recess.

3. A transducer as claimed in claim 1, wherein ducts are provided extending from the recess as far as a marginal shell of the bottom portion of the housing and being in communication with the recess, and the ducts being formed by bores in communication with the recess and extending from the marginal shell of the bottom portion obliquely downwards as far as the recess provided in the bottom portion.

4. A transducer as claimed in claim 1, wherein grooves are provided recessed in the bottom portion of the housing extending as far as the marginal shell of the bottom portion and being open on the outside of the housing, said grooves forming the said recesses.

5. A transducer as claimed in claim 1, wherein grooves are provided recessed in the bottom portion of he housing extending as far as the marginal shell of the bottom portion and being open on the outside of the housing, said grooves forming the said recesses, and in which at least two bands of parallel grooves are provided with said bands of grooves crossing each other thereby subdividing the outer surface of the bottom portion into several surface elements distributed over and across the said surface.

6. A transducer according to claim 1, in which at least two recesses are provided in the bottom portion which are substantially at right angles to each other.